Nov. 28, 1967    G. HOHWART ET AL    3,355,182
INTERNAL DIAPHRAGM CHUCK

Filed May 28, 1965    4 Sheets-Sheet 1

INVENTORS.
George Hohwart
Paul Toth
BY
Harness, Dickey & Pierce
ATTORNEYS.

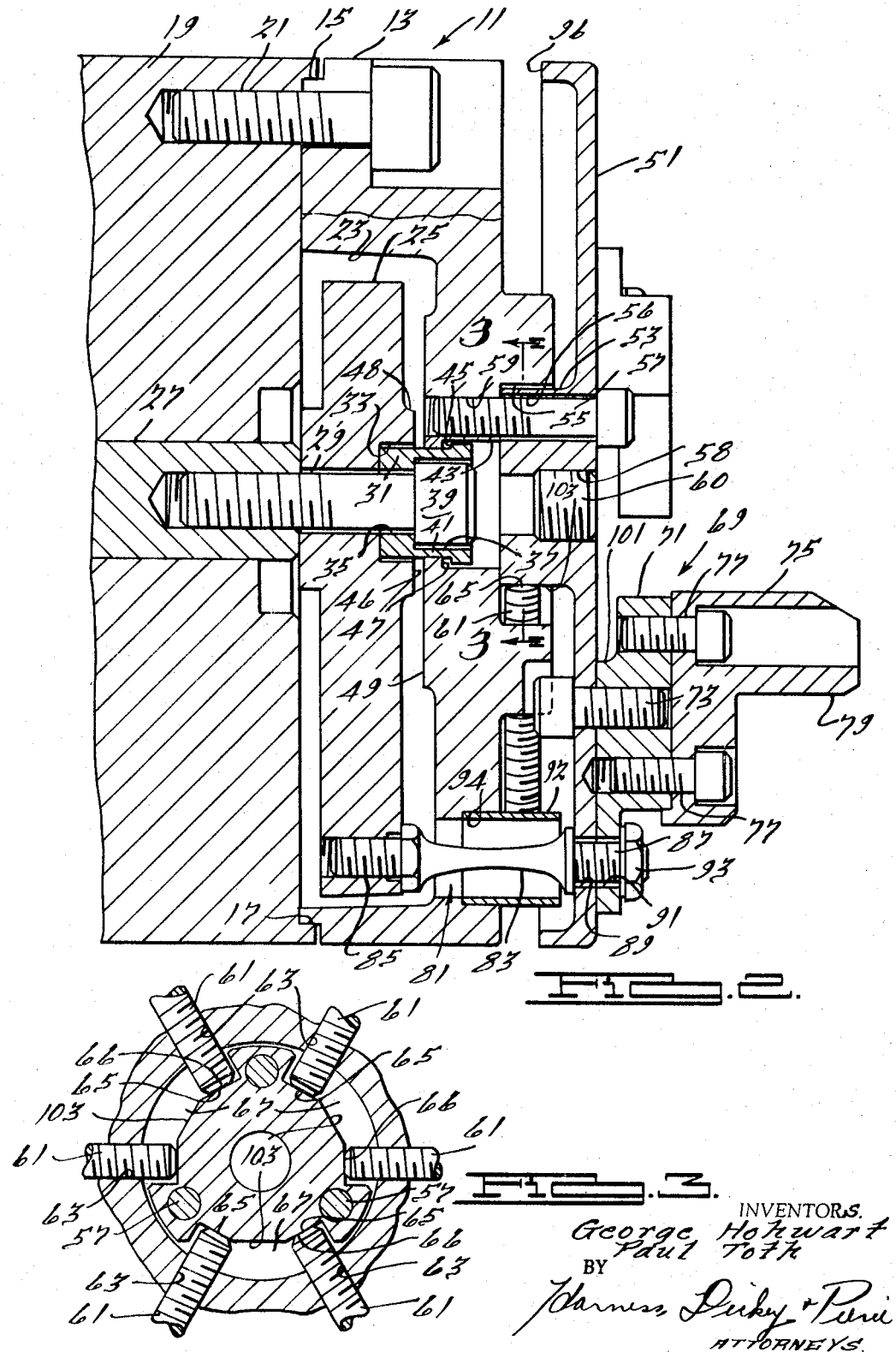

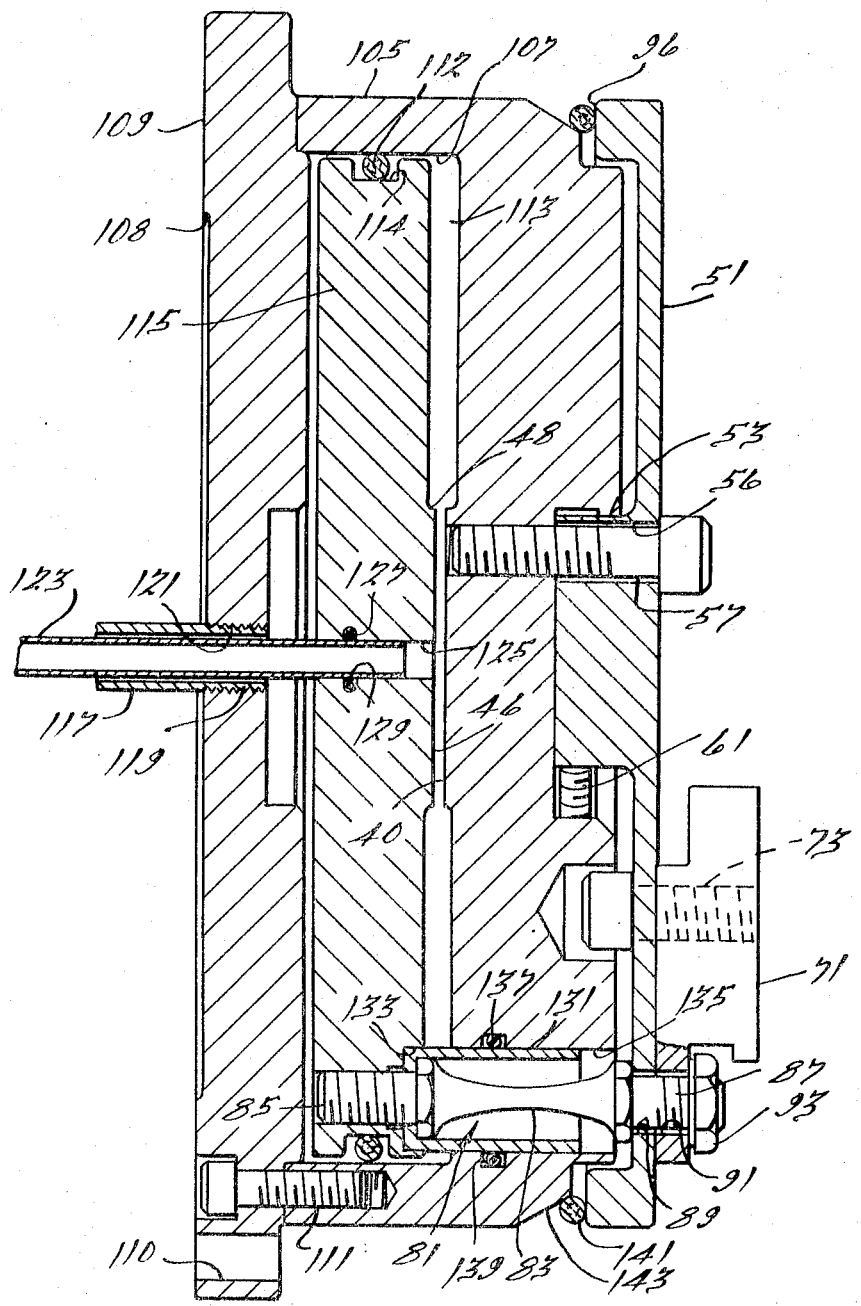

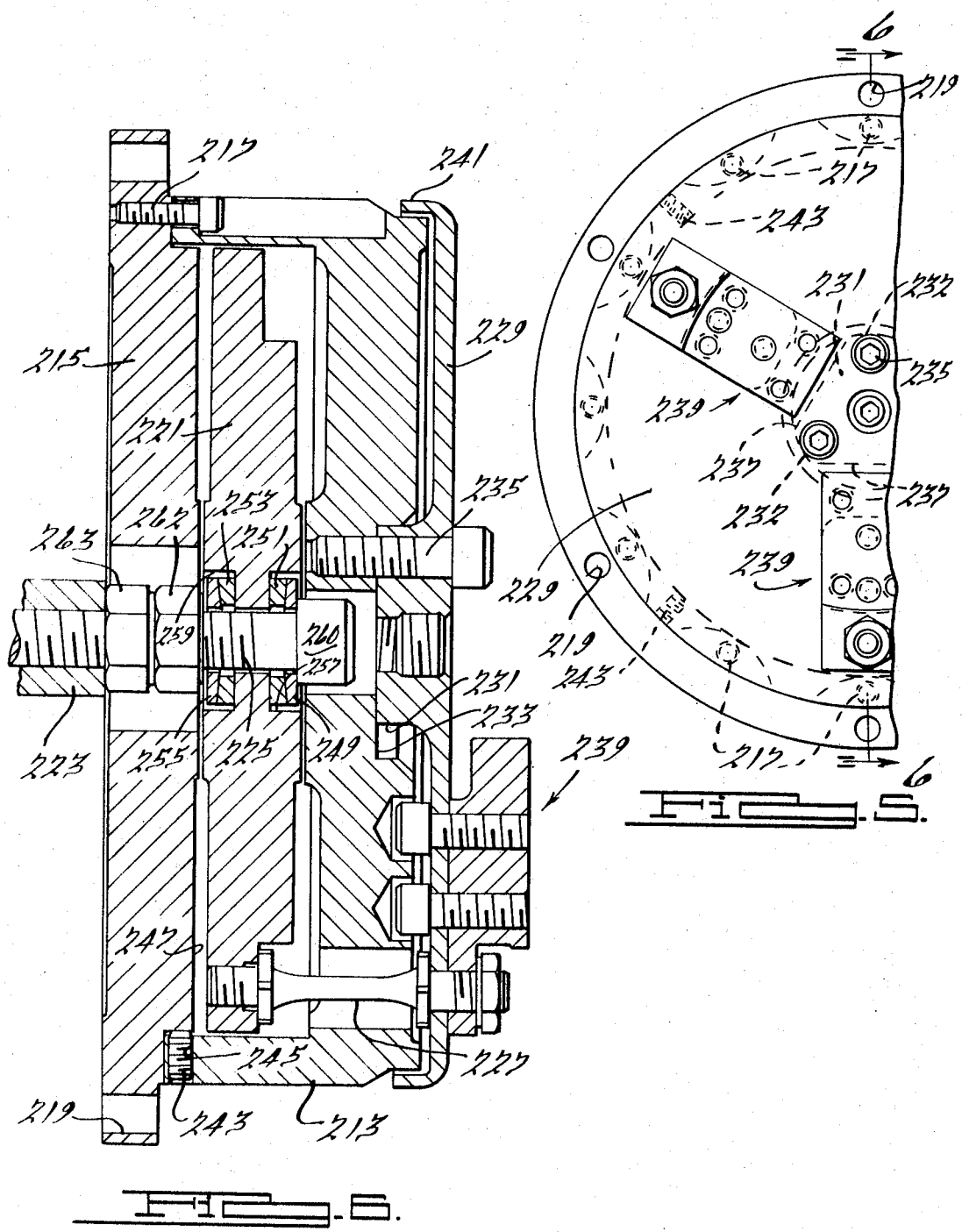

United States Patent Office 3,355,182
Patented Nov. 28, 1967

3,355,182
INTERNAL DIAPHRAGM CHUCK
George Hohwart, Farmington, and Paul Toth, Allen Park, Mich., assignors to N. A. Woodworth Company, Ferndale, Mich., a corporation of Michigan
Filed May 28, 1965, Ser. No. 459,808
18 Claims. (Cl. 279—2)

ABSTRACT OF THE DISCLOSURE

This invention is an internal diaphragm chuck in which the central mounting hub with which the diaphragm conventionally is provided is formed with flat sides opposite the work holding jaws which conventionally are mounted adjacent the outer rim of the diaphragm. These flats help to distribute and enlarge the flexing area of the diaphragm and extend the fatigue life of the diaphragm to an unexpected degree. As a special feature, the chuck actuator is connected to the diaphragm by flexible reeds that are more accurate than the linkage connections conventionally used. Also the reed connectors are not subject to wear and their operation is not affected by dirt, work chips and the like. Another feature of significance is the provision on the periphery of the diaphragm of a stiffening rim which cooperates with the flats referred to above to extend the fatigue life of the diaphragm and to permit the essentially thin diaphragm to withstand the relatively great torque loads to which it is subjected in use.

---

This invention relates generally to chucks and particularly to an improved internal diaphragm chuck, i.e., a chuck adapted to engage and clamp a workpiece internally.

In general, an internal diaphragm chuck includes a resilient member or diaphragm having a relatively large, massive central hub secured to a housing. A plurality of chuck jaws is attached to the diaphragm at angularly spaced locations thereof and upon actuating the outer radial portion of the diaphragm, it flexes causing the jaws to disengage a workpiece held thereby. This workpiece is then removed and a new workpiece positioned on the jaws and upon releasing the diaphragm, it automatically springs back to its original position causing the jaws to grip the new workpiece.

In order to withstand the relatively high chucking pressures normally incurred, the jaws must be relatively large and since it is generally desirable that the overall dimension of chuck be small, these jaws cover a substantial area of the diaphragm. Thus, only a relatively short radial length of diaphragm between the jaws and the central hub is free for flexing. This results in severe stress concentration at these flexure areas and a tendency for the diaphragm to fracture prematurely after only limited use. One solution proposed to overcome this problem was to cut back the underside of the jaws at their inner radial ends. While this has the effect of increasing to some extent the radial length of diaphragm between the hub and jaws free for flexing, the diaphragm still tends to fracture after only limited use and the increase in the life of the chuck achieved by this feature is not significant. There is, therefore, an existing need for an improved diaphragm construction which can eliminate severe stress concentration during flexing and significantly increase the life of the chuck without increasing the overall size or cost thereof.

Another factor to be considered is the fatigue life of the diaphragm. Thus, while it is desirable that the diaphragm have a sufficiently thin construction to insure adequate flexibility and an acceptable fatigue life, care must be taken to insure that the diaphragm possess sufficient strength to move the jaws in unison during operation.

Also, economy makes it desirable that as many as possible of the chuck components be useable with the different types of conventional actuators. Thus, the need exists for overall strength and versatility.

Main objects of the present invention, therefore, are a compact internal diaphragm chuck including an improved diaphragm construction which eliminates severe stress concentration and possesses a relatively long fatigue life and strength to significantly increase the chuck life. Additional objects include a chuck construction of the above character which is versatile in that it is adapted for use with a variety of conventional diaphragm actuators.

Further objects of the present invention include an improved chuck construction of the above character which is relatively inexpensive to manufacture, compact and rugged in construction and reliable in use.

Other objects and advantages of the present invention will become more apparent from a consideration of the following detailed description taken in conjunction with the drawings in which:

FIG. 2 is a sectional view of FIG. 1 taken along the line 2—2 thereof;

FIG. 3 is a sectional view of FIG. 2 taken along the line 3—3 thereof;

FIG. 4 is a view similar to FIG. 2 showing a modified form of chuck;

FIG. 5 is a fragmentary plan view of another modified form of chuck; and

FIG. 6 is a sectional view of FIG. 5 taken along the line 6—6 thereof.

Figure 1:
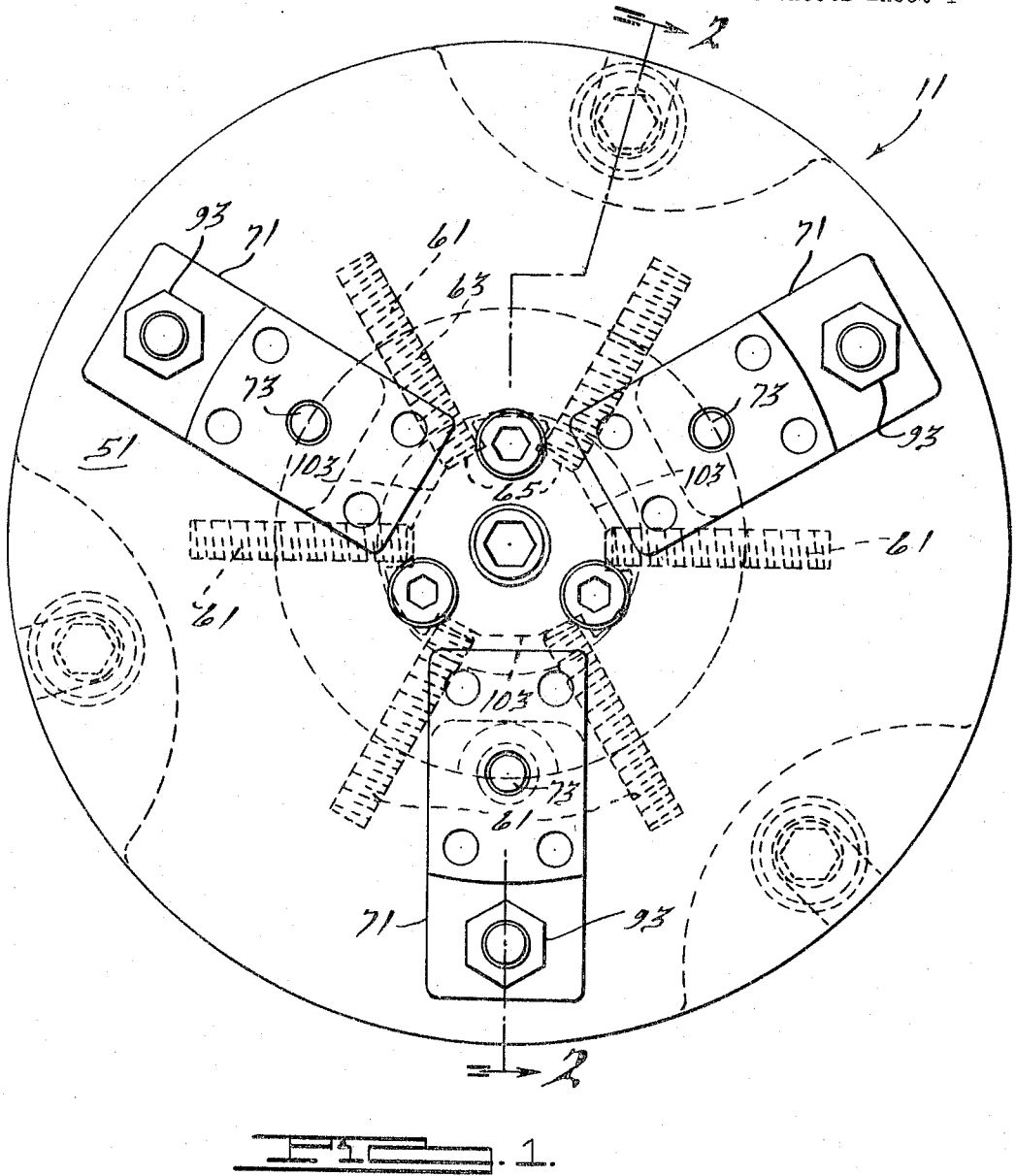
FIGURE 1 is a plan view of a preferred form of chuck constructed according to the present invention and shown with the jaws removed.

Broadly described, the present invention includes an internal diaphragm chuck having a durable and flexible diaphragm provided with a relatively large, massive central hub fixed to the chuck body and wherein the hub outer surface is formed with flat or straight portions aligned radially with each of a plurality of jaws carried by the diaphragm construction which eliminates severe stress by a plurality of angularly spaced flexible reeds which readily adapt to variation in the diaphragm radius occurring during flexing and are constructed for use with pneumatic or mechanical type actuators.

Referring now to the drawings and especially FIGS. 1–3, a preferred form of chuck embodying the present invention is shown generally at 11 and is seen to include a chuck body 13 having a rearwardly extending embossment 15 piloted within a recess 17 formed in a rotatable machine spindle 19. A plurality of angularly spaced screws 21 rigidly connect the chuck body 13 and spindle 19 for conjoint rotation.

The body 13 has a recess 23 which freely receives a mechanically operated actuator plate 25 for movement to and fro therewithin. As seen in FIG. 2, the actuator plate 25 is removably fixed by a screw 29 to a push rod 27 extending centrally through the spindle 19 and connected to a power source (not shown) adapted to impart longitudinal movement thereto relative to the spindle 19. A bushing 31 is positioned within a recess 33 in the forward face of the actuator plate 25 and has a central opening 35 therethrough freely receiving the screw 29. The bushing 31 has a socket 37 in the forward end thereof receiving the screw head 39 and a radially outwardly extending flange 41 freely disposed within a socket 43 in the chuck body 13. The flange 41 defines a rearwardly facing shoulder 45 positioned to abut a forwardly facing shoulder 47 within the socket 43 to limit the rearward movement of the bushing 31 within the socket. This, in turn, also limits the rearward movement of the actuator plate 25 within the body 13. Forward movement of the actuator plate 25 is limited by engagement between a forward face 46 of an embossment 48 formed thereon with a stop surface 49 formed on the body 13.

A resilient diaphragm 51 has an enlarged central hub 53 received within a recess 55 in the forward end of the chuck body 13 and substantially centrally thereof. As shown in FIGS. 1 and 2, the diaphragm hub 53 is secured to the chuck body 13 by a plurality of screws 57 extending loosely through openings 56 in the hub 53 and threadedly received within openings 59 formed in the body 13. An opening 58 in the hub 53 has a removable plug 60 therein and permits free access to the screw 29 without removing the diaphragm 51 from the body 13. A plurality of angularly spaced adjusting screws 61 is threadedly received, each within a radially extending opening 63 in the forward end of the body 13 and each of the screws has its inner end 65 positioned to engage a flat surface 66 formed on the hub 53 within angularly spaced recesses 67 thereof. Thus, by selectively adjusting the screws 61, the diaphragm 51 is accurately positioned upon the chuck body 13, the extent of adjustment being limited by the size of the openings 56 as compared with the screws 57.

A plurality of jaw assemblies 69 is fixed to the front face of the diaphragm 51 in angularly spaced relation therearound. These jaw assemblies each may include a jaw base 71 secured to the diaphragm 51 by copper brazing if a permanent joint is desired, or by a plurality of screws 73. A jaw 75 (only one of which is shown) is removably secured to each of the jaw bases 71 by a plurality of screws 77 and each of the jaws 75 has a workpiece engaging face 79.

The actuator plate 25 is connected to the diaphragm 51 by a plurality of angularly spaced flexible reeds indicated generally at 81 and forming a part of this invention. As shown in FIG. 2, these reeds each includes an intermediate flexible body 83 and an enlarged rearward end 85 threadedly engaged with the actuator plate 25. An enlarged forward end 87 of each of the reeds also is threaded and extends through an opening 89 in the diaphragm 51 and, preferably, also an opening 91 in the jaw base 71. A nut 93 is threaded on each of the ends 87 thereby securing the diaphragm 51 and each of the jaw bases to the actuator plate 25 through the reeds 81. Thus, reciprocating movement imparted to the actuator plate 25 by the push rod 27 is transmitted to the diaphragm 51 through the reeds 81.

Since the diaphragm hub 53 is rigidly fixed to the chuck body 13, the diaphragm 51 flexes forwardly during forward movement of the push rod 27 and springs back to its normal position, shown in FIG. 2, when the push rod is released or is moved rearwardly. It will be apparent that as the diaphragm 51 flexes, a change in its radius occurs; however, the flexible bodies 83 of each of the reeds flex sufficiently to efficiently accommodate this radius change and are sturdy enough to effectively transmit forward movement of the actuator plate 25 to the diaphragm 51. In addition, it is noteworthy that the reeds 81 interconnect the actuator plate 25 and the diaphragm with no contacting relatively moving or sliding surfaces therebetween, thereby eliminating any tendency for wear or interference from dirt, shavings or other foreign matter. However, if desired, a plurality of sleeves 92, one surrounding a major portion of each of the reed bodies 83, is pressed into openings 94 in the body 13 and together with an enlarged rim 96 on the diaphragm form a labyrinth sufficient to keep the reeds 81 free from foreign matter. Also, by positioning the reed assemblies 81 in alignment with the jaw assemblies 69 so that the reed body forward end 87 extends through and is attached to the jaw base 71, the connection between the reed assemblies and the diaphragm is further strengthened.

It is necessary that the diaphragm 51 be relatively thin so that its overall fatigue life is satisfactory. However, quite often these thin-wall diaphragms lack the strength to move jaws in unison. The enlarged outer rim 96 shown in FIG. 2 overcomes this problem and lends the diaphragm 51 sufficient strength to meet industry standards while having no effect on the diaphragm fatigue life.

In use, the inner surface of a workpiece (not shown) is normally held by engagement of the jaw faces 79 therewith. Upon forward movement of the push rod 27, the actuator plate 25 moves forwardly and flexes the diaphragm 51 through the reeds 81. Since the diaphragm hub 53 is rigidly fixed to the chuck body 13, the jaws 75 swing through an arcuate path and move radially inwardly to release the workpiece held thereby, whereupon the workpiece can be removed and a new workpiece placed on the jaws 75. Engagement between the face 46 of the embossment 48 and the stop surface 49 prevents overstressing of the diaphragm 51. Thereafter, the push rod 27 is moved rearwardly and the diaphragm 51 automatically springs back and moves the jaws 75 radially outwardly thereby causing the new workpiece to be securely held thereby with the shoulders 45 and 47 preventing overstressing of the diaphragm in the rearward direction.

As set forth hereinabove, one of the problems which has plagued the industry has been the relatively short life possessed by the diaphragm 51 as evidenced by the tendency for these diaphragms to fracture adjacent the edge of the center hub after only limited use. Conventionally, the central hubs 53 are circular in cross-section and since the jaw assemblies 69 cover a substantial portion of the diaphragm 51, a relatively short area of the diaphragm 51 is left free to flex between the hub 53 and the jaw assemblies 69. In an attempt to overcome this difficulty, the jaw bases 71 are cut back at their radial inward end as shown at 101 in FIG. 2. However, while this does increase the radial length of the diaphragm 51 between the jaw base 71 and the hub 53 left free for flexing, it does not significantly increase the life of the chuck diaphragm as the extreme rigidity possessed by the diaphragm adjacent the center hub 53 in conjunction with the stress concentration at this area results in diaphragm fracture after only limited use.

According to the present invention, the diaphragm 51 and its hub 53 are constructed to overcome the problem of premature diaphragm fracture described above and thereby materially increase the chuck life. It has been discovered that by forming the diaphragm hub 53 so that its periphery includes flat or straight surfaces disposed in radial alignment with each of the jaw assemblies 69, the portion of diaphragm 51 adjacent the hub 53 is made considerably more flexible than it was with the conventional hub which had a circular cross-section. This in turn significantly reduces the stresses at these areas during diaphragm flexing and greatly increases the life expectancy of the diaphragm.

Thus, the hub 53 has a plurality of angularly spaced flat surfaces 103, each of which is aligned with one of the jaw assemblies 69. In the chuck illustrated, there are three jaw assemblies 69, and therefore three flat surfaces 103; however, it is to be understood that this number will vary according to particular needs and desires. Since the reeds 81 are angularly aligned with the jaw assemblies 69, the diaphragm 51 approximates a pivoting action during flexing about axes parallel with the surfaces 103 and the flexing is spread over the entire area of these surfaces. In the conventional circular cross-sectional hub referred to above, the diaphragm is considerably more rigid in the flexing areas between the hub and the jaws. "Pivoting" of the diaphragm in this conventional conventional construction takes place about and is concentrated at points tangent to the hub and aligned with the jaws. In addition, this stress concentration occurs at the region where the hub is closest to the jaws, a condition which is eliminated by the present invention.

FIG. 4 illustrates a modified form of chuck embodying the present invention. In this embodiment, the basic jaw construction and diaphragm configuration is the same, or substantially the same, as that shown in the embodiment of FIGS. 1–3 and is intended to be interchangeable therewith. Therefore, a detailed description of these components is omitted here and like numerals refer to like parts.

The chuck of FIG. 4 is adapted for pneumatic operation and is seen to include a modified chuck body 105 having a cylindrical recess 107 at its rearward end. A backing plate 109 has a recess 108 which reduces the amount of face bearing with the machine spindle and the amount of precision machining required on the backing plate. This backing plate is face mounted (no pilot) on a machine spinde (not shown) and is secured thereto by screws (not shown) extending through openings 110. However, it is to be understood that if a machine spindle of the type illustrated at 19 in FIG. 2 is to have the chuck of FIG. 4 mounted thereon a backing the having a construction modified accordingly could be substituted for that shown at 109 in FIG. 4.

The backing plate 109 is secured to the rearward end of the body 105 by a plurality of screws 111 and forms with the chuck body 105 a chamber 113. A piston 115 is positioned to reciprocate back and forth within the chamber 113 and is connected to the diaphragm 51 by the reeds 81 as was the actuator plate 25 in the embodiment of FIGS. 1–3.

The piston 115 is reciprocated to flex the diaphragm 51 by alternately supplying and exhausting air under pressure to the chamber 113 behind the piston. A conventional O-ring 112 is positioned within a groove 114 in the piston 115 and engages the wall of the chamber 113 to prevent fluid pressure leakage therepast. Thus, a tube 117 extends through the spindle (not shown) and has a threaded terminal 119 screwed into a hole 121 in the backing plate 109. Another tube 123 extends freely through the tube 117 and has its own end slidably received in an opening 125 in the piston 115. An O-ring 127 is positioned in a groove 129 in the opening 125 and sealingly engages the tube 123 to prevent fluid pressure leakage therepast. The other ends (not shown) of the tubes 117 and 123 are connected through suitable valving (not shown) to a controlled source of air pressure (not shown). In use, air under pressure is introduced into the chamber 113 behind the piston 115 through the tube 117 moving the piston forwardly or to the right as viewed in FIG. 4. This movement is transmitted to the diaphragm 51 through the reed assemblies 81 as in the embodiment of FIGS. 1–3 above, with the surfaces 46 and 49 limiting this forward movement. When the air under pressure to the tube 117 is released, the diaphragm 51 automatically springs back to its original position. However, in some instances, it may be desired to hold a workpiece with a greater force than that provided by the diaphragm springing back under its own force, such as, for example, in holding a workpiece during a heavy milling operation. In this instance, air under pressure is supplied through the tube 123 to the chamber 113 in front of the piston 115 to move it rearwardly or to the left as seen in the figure. Engagement between the piston 115 and the backing plate 109 prevents the diaphragm from becoming overstressed in a rearward direction. Otherwise, the tube 123 may be eliminated and the piston 115 made without the opening 125.

As described above, the reeds 81 interconnect the piston 115 and the diaphragm 51 in the same fashion as in the device of FIGS. 1–3. However, in the device of FIG. 4, it is necessary to insure that a fluid pressure loss does not occur around the reeds 81. Thus, a sleeve 131 surrounds each of the reeds 81 and each has one end received in a corresponding recess 133 in the piston 115 and is held thereto by the terminal end 85 of the reeds 81. Each of the sleeves 131 is slidably received in an opening 135 formed in the chuck body 105. An O-ring 137 positioned in a groove 139 in each of the openings 135 surrounds each of the sleeves 131 and prevents the loss of fluid pressure therepast.

This sealing arrangement, i.e., between the sleeve 131 and opening 135, becomes necessary only when the piston 115, and therefore the diaphragm 51, is power operated in both directions. Thus, if the power system using the tube 123 is eliminated, the seal 137 is not needed.

In the construction shown in FIG. 4, a seal 141 is carried by the chuck body 105 along a tapered surface 143 thereof. The enlarged rim 96, shown here to be larger than that in FIG. 2, serves to hold the seal 141 in place and prevent dirt, grease or other foregoing matter from contaminating the interior of the chuck and possibly causing damage or wear of the sliding sleeve 131. However, if the power return system using the tube 123 is elminated, a labyrinth type arrangement such as that formed by the tube 92 and the enlarged rim 96 shown in FIG. 2 is adequate.

The operation of the chuck of FIG. 4 is substantially identical to that of FIGS. 1–3. In addition, the diaphragm 51 of FIG. 4, including its hub 53 and rim 96, is the same as that of FIGS. 1–3 so that a detailed description thereof is omitted here. It is important, however, to note that the diaphragm 51 also with the reeds 81 and the jaws of both configurations are completely interchangeable. The result is that the chuck construction of this invention reduces the overall cost to the consumer both by its versatility and by its relatively long life.

In FIGS. 5 and 6 a further embodiment of the present invention is illustrated. This embodiment is seen to include a body 213 secured to a backing plate 215 by a plurality of screws 217. The backing plate 215 is constructed for facing mounting on a spindle (not shown), as is the backing plate 109 shown in FIG. 4, and is secured thereto by screws (not shown) extending through openings 219. An actuator plate 221 is freely disposed within the body 213 and is removably fixed to a push rod or drawbar 223 by a screw 225. The drawbar extends centrally through the spindle (not shown) and is slidably relative thereto and connected to a power source (not shown) adapted to impart longitudinal movement to the drawbar and to the actuator plate 221.

A plurality of flexible reed assemblies 227, substantially the same as those shown in FIGS. 2 and 4, interconnect the actuator plate 221 and a flexible diaphragm 229. As shown, the diaphragm 229 has an enlarged central hub 231 having angularly spaced arcuate surfaces 232 piloted in a recess 233 formed in the body 213 and is secured thereto by screws 235. The hub 231 has a plurality of, in this case, three flat or straigtht surfaces 237 between and joining the arcuate surfaces 232, one each in radial alignment with a respective one of a plurality of jaw asemblies 239 secured to the diaphragm 229. This is so in order that the stresses imposed on the diaphragm at the areas between the hub 231 and the jaw assemblies 239 during diaphragm flexing are minimized as described in detail in the preceding embodiments. In addition, the diaphragm 229 is constructed to include a rigidifying rim 241 also described in detail in the foregoing embodiments.

The embodiment of FIGS. 5 and 6 distinguishes from the embodiment of FIGS. 1–3 and the FIG. 4 embodiment in that the radial screws of the FIGS. 5 and 6 embodiment for adjusting and centering the diaphragm are located at the joint between the chuck body 213 and the backing plate 215, instead of at the diaphragm hub as shown in the embodiments of FIGS. 1–3 and FIG. 4. Thus, a plurality of angularly spaced screws 243 are disposed in openings 245 in the body 213 and have their inner ends positioned to engage the outer surface of an embossment 247 on the backing plate 215 so that by selectively adjusting these screws, the diaphragm 229 and jaw assemblies 239 are adjusted laterally relative to the backing plate 215 and the spindle (not shown).

Another feature of this embodiment resides in the particular connection between the actuator plate 221 and the drawbar 223. As seen in FIG. 6, two pairs of complementary spherical washers 249, 251 and 253, 255 are disposed in a front and rear recess 257, 259, respectively formed in the actuator plate 221. The screw 225 has a head 260 integral therewith and nuts 262, 263 threaded thereon forming spaced abutments on the screw. These abutments engage the adjacent pairs of washers with forward and rearward travel of the drawbar 223 and cause forward and rearward movement of the actuator plate 221. The outer washers 249 and 255 of each pair is snugly disposed on the screw 225 while the inner washers 251 and 253 have a somewhat larger I.D. than the diameter of the screw 225. Also the confronting spherical surfaces of each pair of washers are arranged oppositely of the confronting spherical surfaces on the other pair. Thus, if the drawbar 223 is cocked slightly as a result either of machining inaccuracies or because it becomes loose or bent, the washers 249 and 255 can slide laterally relative to the washers 251 and 253 along their confronting spherical surfaces to position the chuck perpendicular to the spindle axis for concentric rotation. To accommodate this slide action, a small amount of clearance exists between the head 260 and nut 262 and the two pairs of washers. The operation of the chuck of FIGS. 5 and 6 is substantially the same as that of FIGS. 1–3 and FIG. 4 and a detailed description is omitted here.

While preferred embodiments of this invention are illustrated and described in detail above, various additions, substitutions, modifications and omissions may be made thereto without departing from the spirit of the invention as encompassed by the appended claims.

What is claimed is:

1. An internal diaphragm chuck having a body, a resilient diaphragm having a central hub fixed to said body, actuator means movable within said body and connected to said diaphragm and adapted to flex the latter relative to its hub and said body, a plurality of angularly spaced jaws mounted on said diaphragm and spaced radially outwardly from the central hub, said hub having flat peripheral surfaces each aligned radially inwardly from a respective one of said jaws.

2. An internal diaphragm chuck having a body, a resilient diaphragm having a relatively large massive central hub fixed to said body, actuator means movable within said body and connected to said diaphragm and adapted to flex said diaphragm relative to its hub an said body, a plurality of angularly spaced jaws mounted on said diaphragm and spaced radially outwardly from the central hub, said jaws being cut back at their inner radial ends adjacent the diaphragm, said hub having flat peripheral surfaces each aligned radially inwardly from a respective one of said jaws.

3. An internal diaphragm chuck having a body, a resilient diaphragm having a relatively large massive central hub fixed to said body, actuator means movable within said body and connected to said diaphragm and adapted to flex said diaphragm relative to its hub and said body, three equidistantly spaced jaws mounted on said diaphragm and spaced radially outwardly from the central hub, said hub being generally triangular in cross-section and having three flat peripheral surfaces each aligned radially inwardly from a respective one of said jaws.

4. An internal diaphragm chuck having a body, a resilient diaphragm having a relatively large massive central hub fixed to said body, actuator means movable within said body and connected to said diaphragm and adapted to flex said diaphragm relative to its hub and said body, said actuator means having abutment means thereon adapted to engage complementary abutment means within said body to limit movement of said actuator means, a plurality of angularly spaced jaws mounted on said diaphragm and spaced radially outwardly from the central hub, said hub having flat peripheral surfaces each aligned radially inwardly from a respective one of said jaws.

5. An internal diaphragm chuck having a body, a resilient diaphragm having a relatively large massive central hub fixed to said body, a plurality of angularly spaced jaws fixed to said diaphragm and spaced radially from said hub, actuator means reciprocable within said body toward and away from said diaphragm, a plurality of angularly spaced reeds interconnecting said actuator and said diaphragm, each of said reeds having a flexible mid-portion and spaced ends fixed to said actuator and said diaphragm, respectively, whereby reciprocating movement of said actuator is transmitted through said reeds to flex said diaphragm relative to said hub.

6. An internal diaphragm chuck having a body, a resilient diaphragm having a relatively large massive central hub fixed to said body, a plurality of angularly spaced jaws fixed to said diaphragm and spaced radially from said hub, actuator means reciprocable within said body toward and away from said diaphragm, a plurality of angularly spaced reeds axially aligned with said jaws and interconnecting said actuator and said diaphragm, each of said reeds having a flexible mid-portion and spaced ends fixed to said actuator and said diaphragm and jaws, respectively, whereby reciprocating movement of said actuator is transmitted through said reeds to flex said diaphragm relative to said hub.

7. An internal diaphragm chuck having a body fixed to a spindle a resilient diaphragm having a relatively large massive central hub fixed to said body, a plurality of angularly spaced jaws fixed to said diaphragm and spaced radially from said hub, an actuator plate reciprocable within said body toward and away from said diaphragm, mechanical means extending through said spindle and adapted to reciprocate said plate, a plurality of angularly spaced reeds interconnecting said actuator plate and said diaphragm, each of said reeds having a flexible mid-portion and spaced ends fixed to said actuator plate and said diaphragm, respectively, whereby reciprocating movement of said actuator plate is transmitted through said reeds to flex said diaphragm relative to said hub.

8. An internal diaphragm chuck having a body having a fluid pressure chamber therein, a resilient diaphragm having a relatively large massive central hub fixed to said body, a plurality of angularly spaced jaws fixed to said diaphragm and spaced radially from said hub, a piston reciprocable within said chamber toward and away from said diaphragm, a plurality of angularly spaced reeds interconnecting said piston and said diaphragm, each of said reeds having a flexible mid-portion and spaced ends fixed to said actuator and said diaphragm, respectively, whereby reciprocating movement of said piston is transmitted through said reeds to flex said diaphragm relative to said hub.

9. An internal diaphragm chuck having a body, a resilient diaphragm having a relatively large massive central hub fixed to said body, a plurality of angularly spaced jaws fixed to said diaphragm and spaced radially from said hub, said diaphragm having a relatively thin diaphragm wall and an enlarged rigidifying rim formed at the outer periphery thereof, and actuator means movable within said body and connected to said diaphragm and adapted to flex said diaphragm relative to its hub and said body.

10. An internal diaphragm chuck having a body, a resilient diaphragm having a relatively large massive central hub received within a recess in said body, a plurality of radially extending screws carried by said body and each having an end extending into said recess and engaging said hub, actuator means movable within said body and connected to said diaphragm and adapted to flex said diaphragm relative to its hub and said body, a plurality of angularly spaced jaws mounted on said diaphragm and spaced radially outwardly from said central hub, said hub having flat peripheral surfaces each aligned radially inwardly from a respective one of said jaws.

11. An internal diaphragm chuck having a body, a resilient diaphragm having a relatively large massive central hub fixed to said body, actuator means reciprocable within said body toward and away from said diaphragm, a plurality of angularly spaced jaws mounted on said diaphragm and spaced radially outwardly from said central hub, a plurality of angularly spaced reeds interconnecting said actuator and said diaphragm, each of said reeds having a flexible mid portion and spaced ends fixed to said actuator and said diaphragm, respectively, said hub having flat peripheral surfaces each aligned radially inwardly from a respective one of said jaws, whereby reciprocating movement of said actuator is transmitted through said reeds to flex said diaphragm relative to said hub.

12. An internal diaphragm chuck having a body, a resilient diaphragm having a relatively large massive central hub fixed to said body, actuator means reciprocable within said body toward and away from said diaphragm, three equidistantly spaced jaws mounted on said diaphragm and spaced radially outwardly from said central hub, three equidistantly spaced reeds interconnecting said actuator and said diaphragm, each of said reeds having a flexible mid-portion and spaced ends fixed to said actuator, said diaphragm and jaws, respectively, said hub being generally triangular in cross-section and having three flat peripheral surfaces each aligned radially inwardly from a respective one of said jaws, whereby reciprocating movement of said actuator is transmitted through said reeds to flex said diaphragm relative to said hub.

13. An internal diaphragm chuck having a body, a resilient diaphragm having a relatively large massive central hub fixed to said body and a relatively thin wall extending radially outwardly from said hub and bounded by an enlarged rigidifying rim, actuator means reciprocable within said body toward and away from said diaphragm, three equidistantly spaced jaws mounted on said diaphragm wall and spaced radially outwardly from said central hub, three equidistantly spaced reeds interconnecting said actuator and said diaphragm, each of said reeds having a flexible mid-portion and spaced ends fixed to said actuator, said diaphragm and jaws, respectively, said hub being generally triangular in cross-section and having three flat peripheral surfaces each aligned radially inwardly from a respective one of said jaws, whereby reciprocating movement of said actuator is transmitted through said reeds to flex said diaphragm relative to said hub.

14. An internal diaphragm chuck having a body, a resilient diaphragm having a relatively large massive central hub fixed to said body and a relatively thin wall extending radially outwardly from said hub and bounded by an enlarged rigidifying rim, actuator means reciprocable within said body toward and away from said diaphragm, said actuator means having abutment means thereon, adapted to engage complementary abutment means within said body to limit movement of said actuator means, three equidistantly spaced jaws mounted on said diaphragm wall and spaced radially outwardly from said central hub, three equidistantly spaced reeds interconnecting said actuator and said diaphragm, each of said reeds having a flexible mid-portion and spaced ends fixed to said actuator, said diaphragm and jaws, respectively, said hub being generally triangular in cross-section and having three flat peripheral surfaces each aligned radially inwardly from a respective one of said jaws, whereby reciprocating movement of said actuator is transmitted through said reeds to flex said diaphragm relative to said hub.

15. An internal diaphragm chuck having a body, a resilient diaphragm having a relatively large massive central hub having angularly spaced arcuate outer peripheral surfaces piloted within a recess in said body, a backing plate having a forwardly extending embossment freely received in said body a plurality of radially extending screws carried by said body and each having an end extending into engagement with said embossment, actuator means movable within said body connected to and adapted to flex said diaphragm relative to its hub and said body, and a plurality of angularly spaced jaws mounted on said diaphragm and spaced radially outwardly of said central hub, said hub having flat peripheral surfaces each aligned radially inwardly from a respective one of said jaws and joining adjacent ones of said arcuate surfaces.

16. An internal diaphragm chuck having a body assembly adapted to be fixed to a spindle, a resilient diaphragm having a relatively large massive central hub fixed to said body, a plurality of angularly spaced jaws fixed to said diaphragm and spaced radially from said hub, an actuator plate reciprocable within said body toward and away from said diaphragm, and connected thereto at a position spaced outwardly of said hub, a draw bar extending through said spindle and movable longitudinally relative thereto, means interconnecting said draw bar and said actuator plate including elongated means extending through said actuator plate, spaced abutment means on each said abutment and the adjacent side of said actuator plate, a pair of washers on said elongated means between each said abutment and the adjacent side of said actuator plate, each pair of washers having confronting complementary spherical faces with the faces of one pair arranged opposite the faces of the other pair, at least one of said washers of each pair being movable laterally of said elongated means and relative to the other of said washers.

17. An internal diaphragm chuck having a body assembly adapted to be fixed to a spindle, a resilient diaphragm having a relatively large massive central hub fixed to said body, a plurality of angularly spaced jaws fixed to said diaphragm and spaced radially from said hub, an actuator plate reciprocable within said body toward and away from said diaphragm, and connected thereto at a position spaced outwardly of said hub, a drawbar extending through said spindle and movable longitudinally relative thereto, mean interconnecting said drawbar and said actuator plate including a screw extending through said actuator plate and secured to said drawbar, said screw having a head portion and a nut thereon forming spaced abutment means disposed on either side of said actuator plate, a recess on either side of said actuator plate, a pair of washers on said screw adjacent each said abutment and disposed in respective one of said recesses in said actuator plate, each pair of washers having confronting complementary spherical faces with the faces of one pair arranged opposite the faces of the other pair, at least one of said washers of each pair being movable laterally of said screw and relative to the other of said washers.

18. An internal diaphragm chuck having a hollow body; a resilient diaphragm having a central hub portion fixed to said body, a flexible and resilient wall portion extending radially outwardly from said hub portion and spaced from and freely flexible relative to said body, and an enlarged rim at the outer periphery of said wall portion for holding the latter essentially rigid when flexed; a plurality of angularly spaced jaws on said diaphragm spaced radially equidistantly from said hub and adapted to accept workpieces when the diaphragm is flexed away from said body and to clamp said workpiece when said diaphragm flexes back toward said body; mechanical actuator means including an axially movable radial actuator member disposed in said body, power operated means operatively connected to said actuator member, and connecting means on the peripheral portion of said actuator member extending forwardly thereof through said body and connected to the peripheral portion of said diaphragm, said actuator means adapted to push the peripheral portion of said diaphragm to flex the latter to said work receiving position and to pull on said peripheral portion to augment the natural resiliency of said diaphragm to clamp said workpiece; and means for limiting movement of said actuator means both forwardly and rearwardly.

References Cited

UNITED STATES PATENTS 2,714,514  8/1955  Hohwart _____ 279—1

ROBERT C. RIORDON, *Primary Examiner.*

E. A. CARPENTER, *Assistant Examiner.*

UNITED STATES PATENT OFFICE
CERTIFICATE OF CORRECTION

Patent No. 3,355,182　　　　　　　　　　November 28, 1967

George Hohwart et al.

It is hereby certified that error appears in the above numbered patent requiring correction and that the said Letters Patent should read as corrected below.

Column 2, line 46, for "construction which eliminates severe stress" read -- . The diaphragm is connected to its actuator --; column 5, line 24, for "spinde" read -- spindle --; line 28, for "the" read -- plate --; column 6, line 35, for "also" read -- along --; column 10, line 37, for "each said abutment and the adjacent" read -- said elongated means on either --.

Signed and sealed this 10th day of December 1968.

(SEAL)
Attest:

Edward M. Fletcher, Jr.　　　　　　　　EDWARD J. BRENNER
Attesting Officer　　　　　　　　　　　Commissioner of Patents